(12) United States Patent
Maruta

(10) Patent No.: US 10,816,047 B2
(45) Date of Patent: Oct. 27, 2020

(54) WET PARKING BRAKE DEVICE

(71) Applicant: KABUSHIKI KAISHA TOYOTA JIDOSHOKKI, Kariya-shi, Aichi-ken (JP)

(72) Inventor: Yuki Maruta, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 16/430,815

(22) Filed: Jun. 4, 2019

(65) Prior Publication Data

US 2019/0376569 A1 Dec. 12, 2019

(30) Foreign Application Priority Data

Jun. 7, 2018 (JP) ................................. 2018-109097

(51) Int. Cl.
*F16D 55/38* (2006.01)
*F16D 65/18* (2006.01)
*F16D 125/28* (2012.01)

(52) U.S. Cl.
CPC ............. *F16D 55/38* (2013.01); *F16D 65/18* (2013.01); *F16D 2125/28* (2013.01)

(58) Field of Classification Search
CPC .... F16D 55/38–40; F16D 65/12; F16D 65/18; F16D 65/136; B60K 17/046
USPC ................ 188/71.5, 170, 264 B, 264 D; 192/219.4–219.6; 475/116, 311
See application file for complete search history.

(56) References Cited

U.S. PATENT DOCUMENTS

| 7,861,831 | B2* | 1/2011 | Chung | B66F 9/07509 188/71.5 |
|---|---|---|---|---|
| 7,980,364 | B2* | 7/2011 | Ueno | B60K 17/046 188/71.5 |
| 8,771,132 | B2* | 7/2014 | Fujimoto | B60K 17/046 475/311 |
| 2013/0062928 | A1* | 3/2013 | Crawford | B60B 27/06 301/105.1 |
| 2019/0383337 | A1* | 12/2019 | Ogiwara | B60T 1/062 |

FOREIGN PATENT DOCUMENTS

JP 2008-002639 A 1/2008

* cited by examiner

*Primary Examiner* — Christopher P Schwartz
(74) *Attorney, Agent, or Firm* — Sughrue Mion, PLLC

(57) ABSTRACT

A wet parking brake device includes a shaft case, a rotary shaft, a plurality of stators, a plurality of brake discs, a piston plate, and a pressing mechanism. The wet parking brake is configured such that the brake discs and the stators come in contact with each other by a pressing from the piston plate pressed by the pressing mechanism to thereby generate a braking force against the rotary shaft. The pressing mechanism includes a parking rod that is turnably supported in the shaft case and has a turning axis in the vertical direction and an arm member that is connected to the parking rod and turns around the turning axis. The parking rod includes a rod main body, an upper shaft portion and a lower shaft portion.

3 Claims, 7 Drawing Sheets

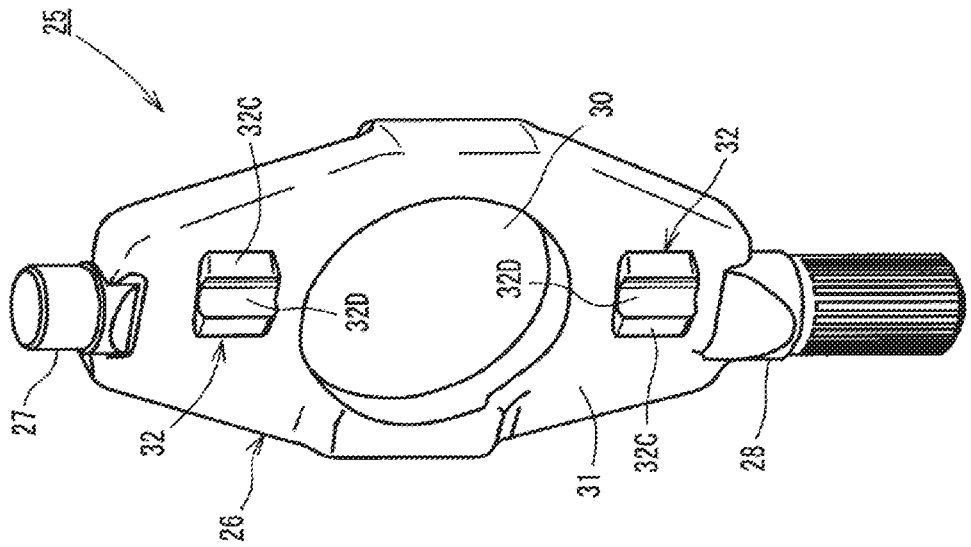
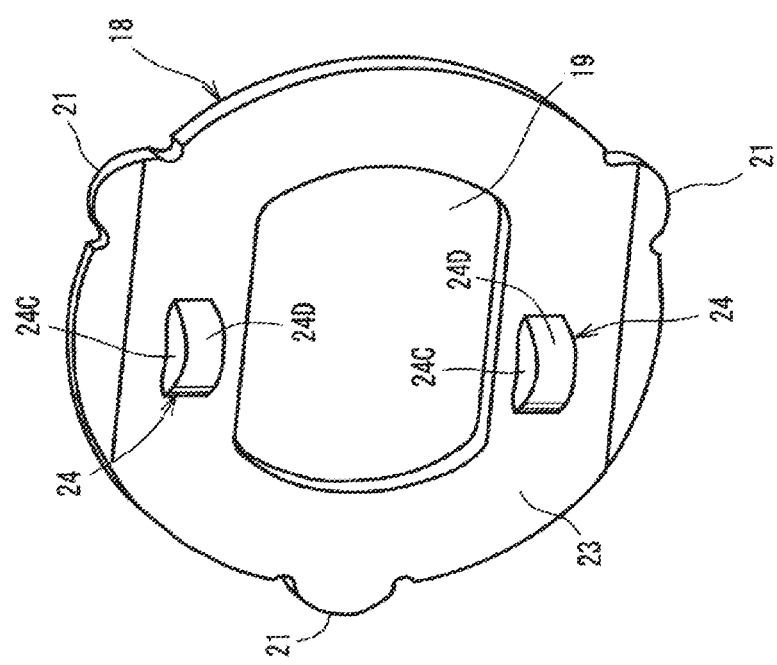

WET PARKING BRAKE DEVICE

CROSS-REFERENCE TO RELATED APPLICATION

This application claims priority to Japanese Patent Application No. 2018-109097 filed on Jun. 7, 2018, the entire disclosure of which is incorporated herein by reference.

BACKGROUND ART

The present disclosure relates to a wet parking brake device.

Japanese Patent Application Publication No. 2008-2639 discloses an example of a parking brake device, which is known as a conventional wet parking brake device. The parking brake device disclosed in the Publication includes a plurality of brake discs and stators. The brake discs are arranged, on a rotary shaft, side by side in an axial direction of the rotary shaft in the shaft case. Each stator held on the shaft case is interposed between the two adjacent brake discs. A piston plate facing the brake disc at an outermost end is held on the shaft case, in which a pressing mechanism to press the piston plate is provided. The pressing mechanism includes a fulcrum shaft, a fork, a tilt lever, and an operation lever connected to a wire. The fulcrum shaft crosses below the rotary shaft. The fork, which works as a pressing member, is mounted on the fulcrum shaft. The tilt lever is fixed on an end portion of the fulcrum shaft. The operation lever activates the tilt lever to move simultaneously when operated.

However, according to the parking brake device disclosed in the Publication, a part of the fork protrudes outwardly in the radial direction of the piston plate. Such a part of the fork prevents downsizing the parking brake device. In addition, according to the parking brake device disclosed in the Publication, the distance between the fulcrum shaft of the fork as the pressing member and the pressing position at which the piston plate is pressed by the fork is so large that this configuration can easily restrict a pressing force required to secure a braking force.

The present disclosure has been made in view of the above circumstances and is directed to providing a wet parking brake device which secures a sufficient braking force and achieves to downsize itself.

SUMMARY

In accordance with an aspect of the present disclosure, there is provided a wet parking brake device that includes a shaft case, a rotary shaft, a plurality of stators, a plurality of brake discs, a piston plate, and a pressing mechanism. The rotary shaft is accommodated in the shaft case. A plurality of stators is held on the shaft case and arranged side by side movably in the axial direction of the rotary shaft. A plurality of brake discs held on the rotary shaft and each of which is interposed between any two adjacent stators of the plurality of stators. A piston plate is held on the shaft case and movable toward the brake discs in the axial direction of the rotary shaft. A pressing mechanism is configured to press the piston plate toward the brake discs. The wet parking brake device is configured such that the brake discs and the stators come in contact with each other by a pressing from the piston plate pressed by the pressing mechanism to thereby generate a braking force against the rotary shaft. The pressing mechanism includes a parking rod that is turnably supported in the shaft case and has a turning axis in the vertical direction and an arm member that is connected to the parking rod and turns around the turning axis. The parking rod includes a rod main body, an upper shaft portion and a lower shaft portion. The rod main body which has an insertion hole through which the rotary shaft is inserted and a pressing portion that presses the piston plate. The upper shaft portion is located on an upper part of the rod main body. The lower shaft portion is located on a lower part of the rod main body and is coaxial with the upper shaft portion. The rod main body has a shape which does not protrude from an area enclosed by an outer peripheral edge of the piston plate in the radial direction of the rotary shaft.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIG. 7A is a perspective view of a piston plate according to another embodiment of the present disclosure; and FIG. 7B is a perspective view of a parking rod according to another embodiment of the present disclosure.

DETAILED DESCRIPTION OF THE EMBODIMENTS

The following will describe a wet parking brake device according to an embodiment of the present disclosure with reference to the accompanying drawings. The wet parking brake device according to the present embodiment is applied to the wet parking brake device mounted on a forklift as an industrial vehicle. The front and rear, the left and right, and the upper and lower, which words define the direction, are determined on the basis of the state in which an operator of the forklift sits down on a driver's seat and looks at the direction to which the forklift moves forward.

Figure 1:
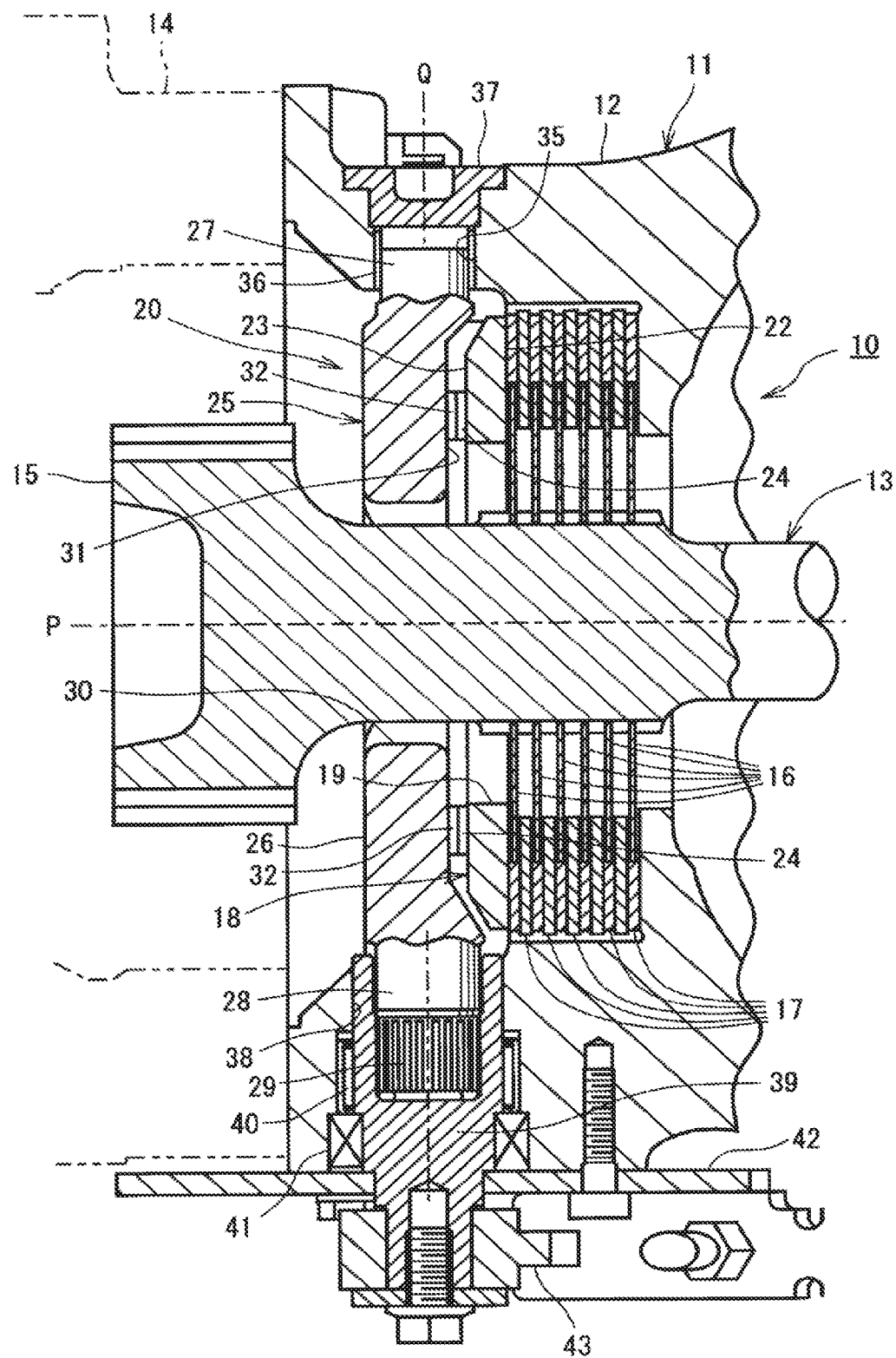
FIG. 1 is a longitudinal sectional view of a wet parking brake device according to an embodiment of the present disclosure.

As shown in FIG. 1, a wet parking brake device 10 is provided in a shaft case 12 of a front axle 11. A rotary shaft 13 is accommodated in the shaft case 12. A central axis P of the rotary shaft 13, which is inserted through the shaft case 12, extends in the width direction of the forklift. The rotary shaft 13 is the input shaft which transmits the torque from a driving source (not shown) to drive wheels (not shown) by using a differential mechanism (not shown). A wheel side case 14 is connected to an end surface of the shaft case 12. The front axle 11 sealed with the shaft case 12 and the wheel side case 14 is filled with lubrication oil.

As shown in FIG. 1, one end portion of the rotary shaft 13 on the drive wheels side includes a cylindrical portion 15 formed in a cylindrical shape. Another end portion of the rotary shaft 13 is connected to the differential mechanism. On an outer peripheral surface of the rotary shaft 13 in the shaft case 12, a plurality of brake discs 16, each of which has a perforated disc shape, are disposed by spline joint. These brake discs 16 have friction surfaces perpendicular to the axial direction of the rotary shaft 13. The brake discs 16, which are held by spline joint on the outer peripheral surface of the rotary shaft 13, are movable in the axial direction of the rotary shaft 13 and are held thereon so as to prevent the relative rotation to the rotary shaft 13. Thus, the brake discs 16 rotate integrally with the rotary shaft 13 during the rotation of the rotary shaft 13.

On the inner wall surface of the shaft case 12, a plurality of stators 17, each of which has a perforated disc shape, are disposed. These stators 17 are arranged side by side in the axial direction of the rotary shaft 13 in the shaft case 12, and have friction surfaces perpendicular to the axial direction of the rotary shaft 13. In an outer peripheral edge (not shown) of each stator 17, a locking claw is formed. The plurality of the stators 17 are held on the shaft case 12 by the locking claws. The locking claws prevent the stators 17 from rotating in the rotation direction of the rotary shaft 13 relative to the shaft case 12. In the inner wall of the shaft case 12, grooves (not shown) corresponding to the locking claws of the stators 17 are formed in the axial direction of the rotary shaft 13. Thus, the stators 17 are movable in the axial direction of the rotary shaft 13.

The brake discs 16 and the stators 17 are disposed alternatively in the axial direction of the rotary shaft 13. This means that each of the brake discs 16 is interposed between two adjacent stators 17. The friction surfaces of the brake discs 16 and the friction surfaces of the stators 17 face each other. Of the plurality of the brake discs 16, the brake disc 16 that is closest to the differential mechanism faces an end surface of the shaft case 12. Of the plurality of the stators 17, the stator 17 that is closest to the wheels faces a piston plate 18, which has a perforated disc shape and is provided in the inner wall surface of the shaft case 12.

Figure 2:
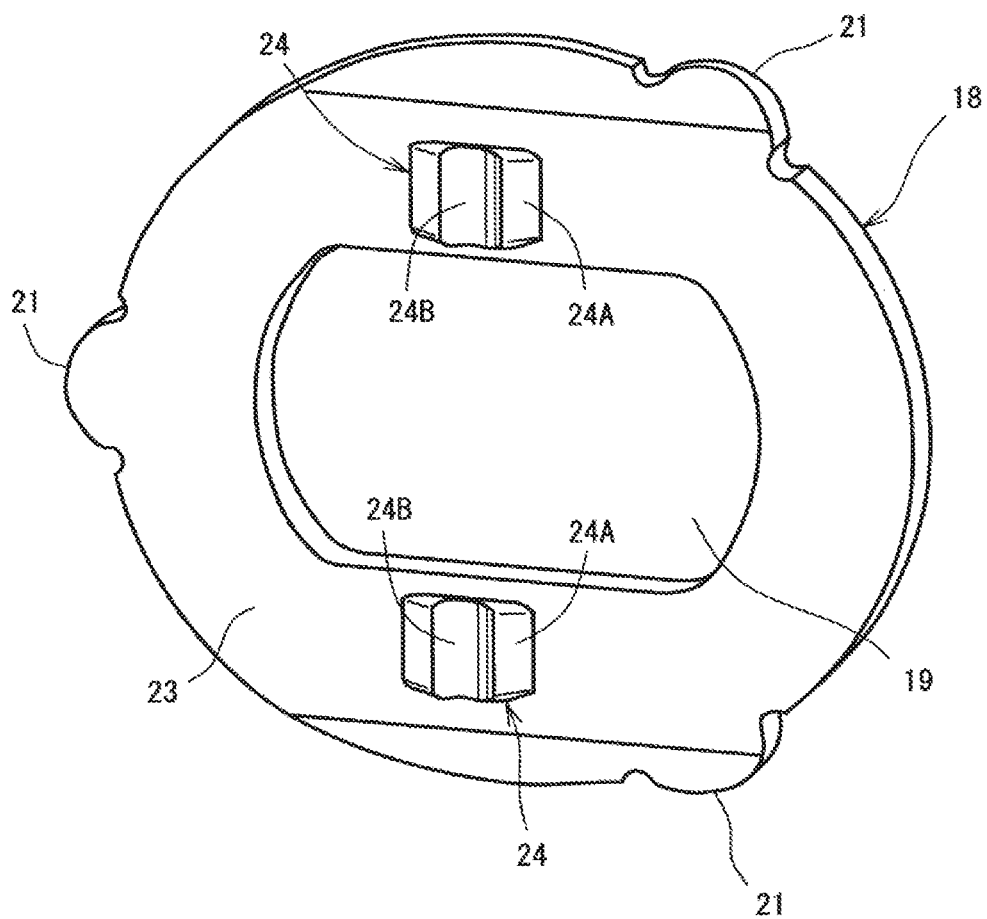
FIG. 2 is a perspective view of a piston plate of the wet parking brake device according to the embodiment of the present disclosure.

The piston plate 18 has a through hole 19 through which the rotary shaft 13 is inserted. The piston plate 18 is movable toward the brake discs 16 in the axial direction of the rotary shaft 13 relative to the shaft case 12. A pressing mechanism 20 to be described later presses the piston plate 18 toward the brake discs 16. As shown in FIG. 2, in an outer peripheral edge of the piston plate 18, a plurality of locking claws 21 are provided like the stators 17. When the locking claws 21 are inserted into the corresponding grooves for the locking claw 21 formed in the shaft case 12, the piston plate 18 is held on the shaft case 12, so that the rotation of the piston plate 18 in the rotation direction of the rotary shaft 13 relative to the shaft case 12 is prevented. The outline of the outer peripheral edge in the piston plate 18 in the radial direction of the rotary shaft 13, is the same as that of the stators 17. An urging member (not shown) which urges the piston plate 18 toward the wheel side is mounted on the piston plate 18.

A plate surface 23 opposed to a plate surface 22 of the piston plate 18 facing the brake discs 16 includes a pair of pressed portions 24. One of the pressed portions 24 is located in the upper side of the through hole 19 and the other is located in the lower side of the through hole 19. The pressed portions 24 are pressed by the pressing mechanism 20. Each of the pressed portions 24 of the present embodiment is formed of a projection 24A projecting from the plate surface 23. The projection 24A has a recessed curve surface 24B having an arched cross section. The upper and lower recessed curve surfaces 24B are coaxial with each other, that is, the centers of the upper and lower recessed curve surfaces 24B in the radial direction coincide with each other.

The pressing mechanism 20 is configured to press the piston plate 18 by operation of a parking lever (not shown), so that the brake discs 16 and the stators 17 come in contact with each other by the pressing from the piston plate 18 pressed by the pressing mechanism 20. This contact generates the braking force against the rotary shaft 13. The pressing mechanism 20 includes a parking rod 25 which is turnably supported in the shaft case 12. The parking rod 25 includes a rod main body 26, an upper shaft portion 27 located on an upper part of the rod main body 26, and a lower shaft portion 28 located on a lower part of the rod main body 26. The parking rod 25 of the present embodiment is manufactured by forging.

Figure 3:
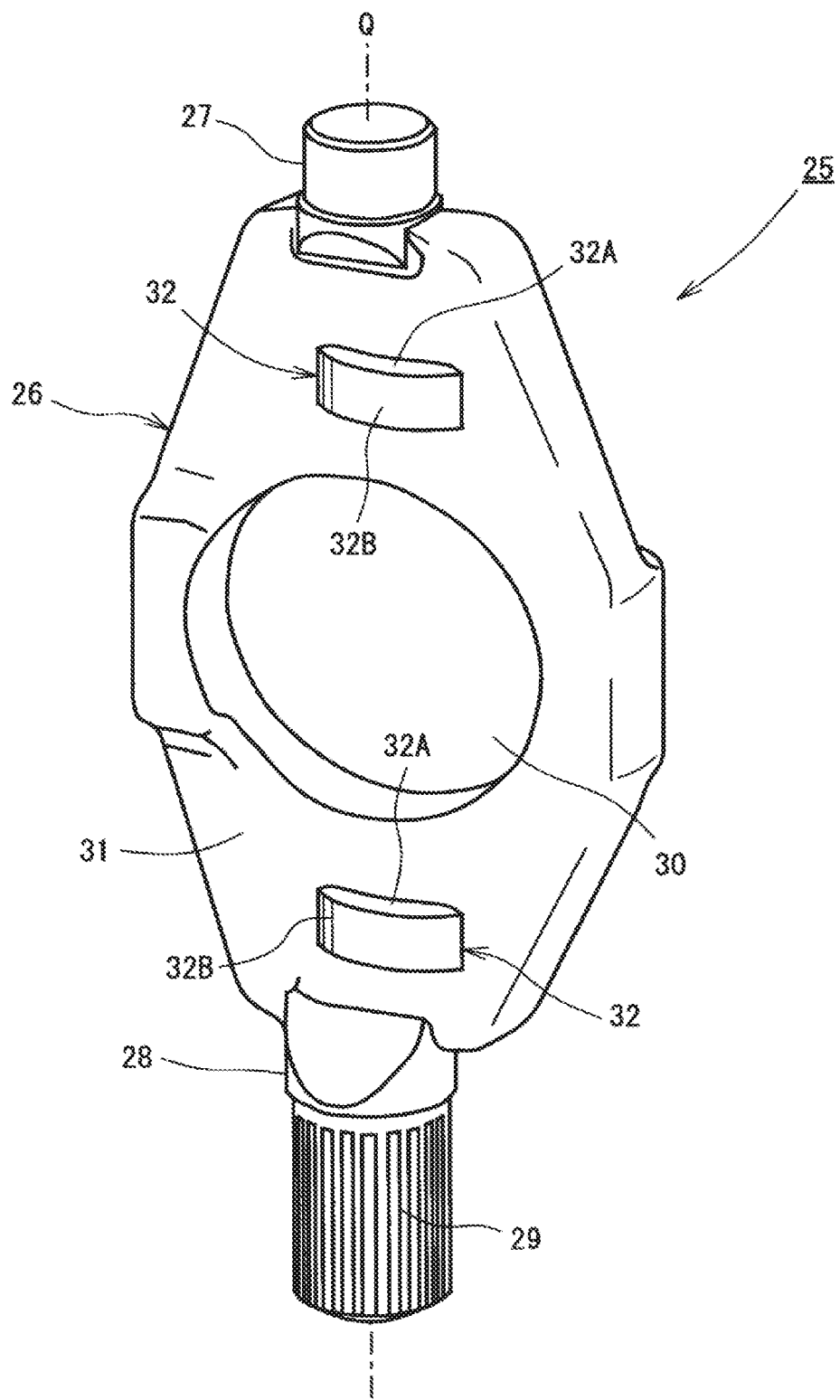
FIG. 3 is a perspective view of a parking rod of the wet parking brake device according to the embodiment of the present disclosure.
Figure 4:
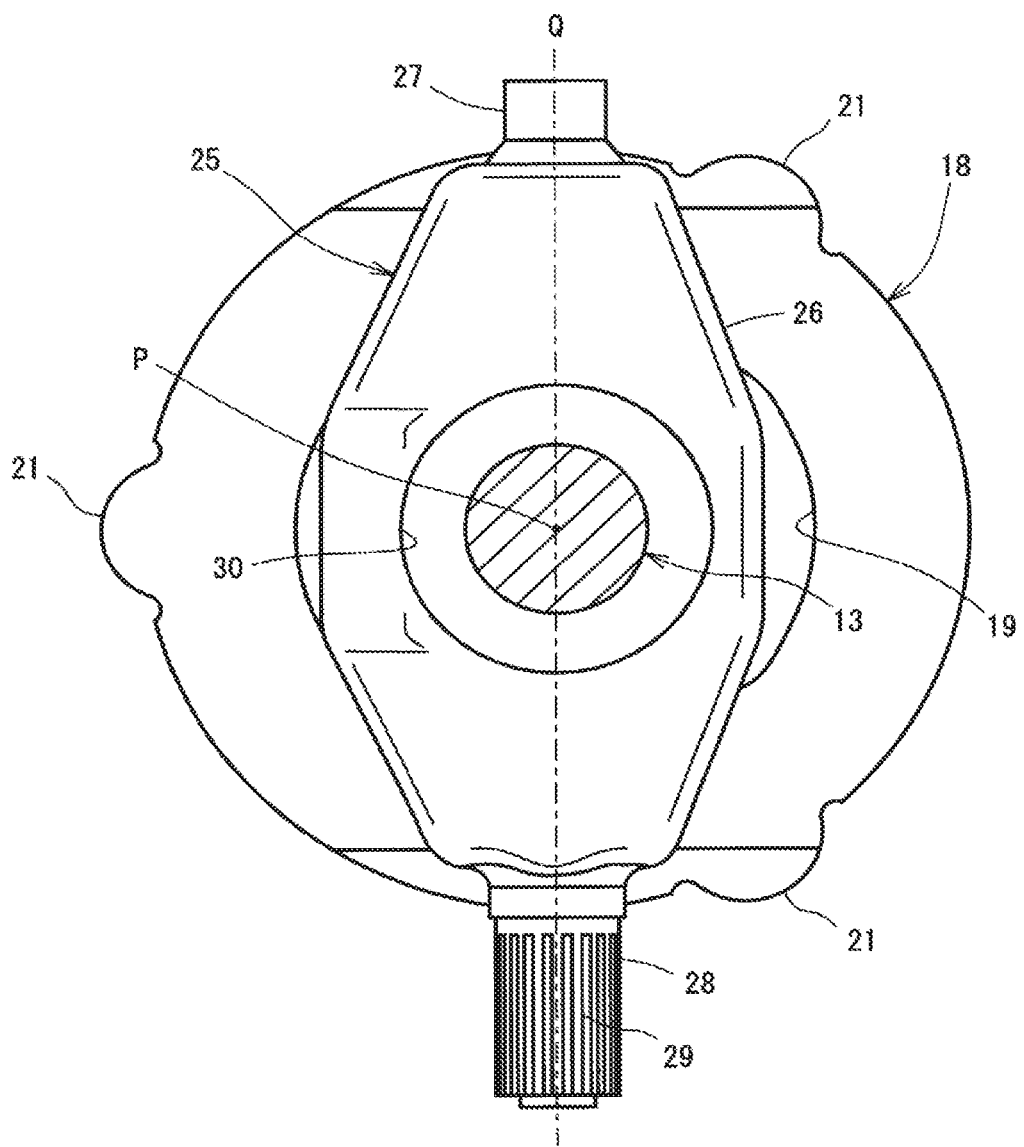
FIG. 4 is a front view showing the positional relation between the parking rod and the piston plate according to the embodiment of the present disclosure.

FIG. 3 is a perspective view of the parking rod 25 viewed from the side of the piston plate 18. As shown in FIG. 3, the rod main body 26 has the shape in which the length in the vertical direction is longer than that in the horizontal direction. The shape of the rod main body 26 is formed so as not to interfere with the rotary shaft 13 under braking operation and non-braking operation. The rod main body 26 has in the center thereof an insertion hole 30 through which the rotary shaft 13 is inserted. As shown in FIG. 4, the rod main body 26 is located radially inward of the area enclosed by the outer peripheral edge of the piston plate 18 in the radial direction of the rotary shaft 13. In an opposite surface 31 of the rod main body 26 facing the piston plate 18, a pair of pressing portions 32 is provided in the upper and lower sides of the rod main body 26 across the insertion hole 30. The pressing portions 32 press the pressed portions 24 in the plate surface 23 of the piston plate 18 to generate the braking force. Therefore, the upper and lower pressing portions 32 are located to be contactable with the upper and lower pressed portions 24, respectively.

Figure 5:
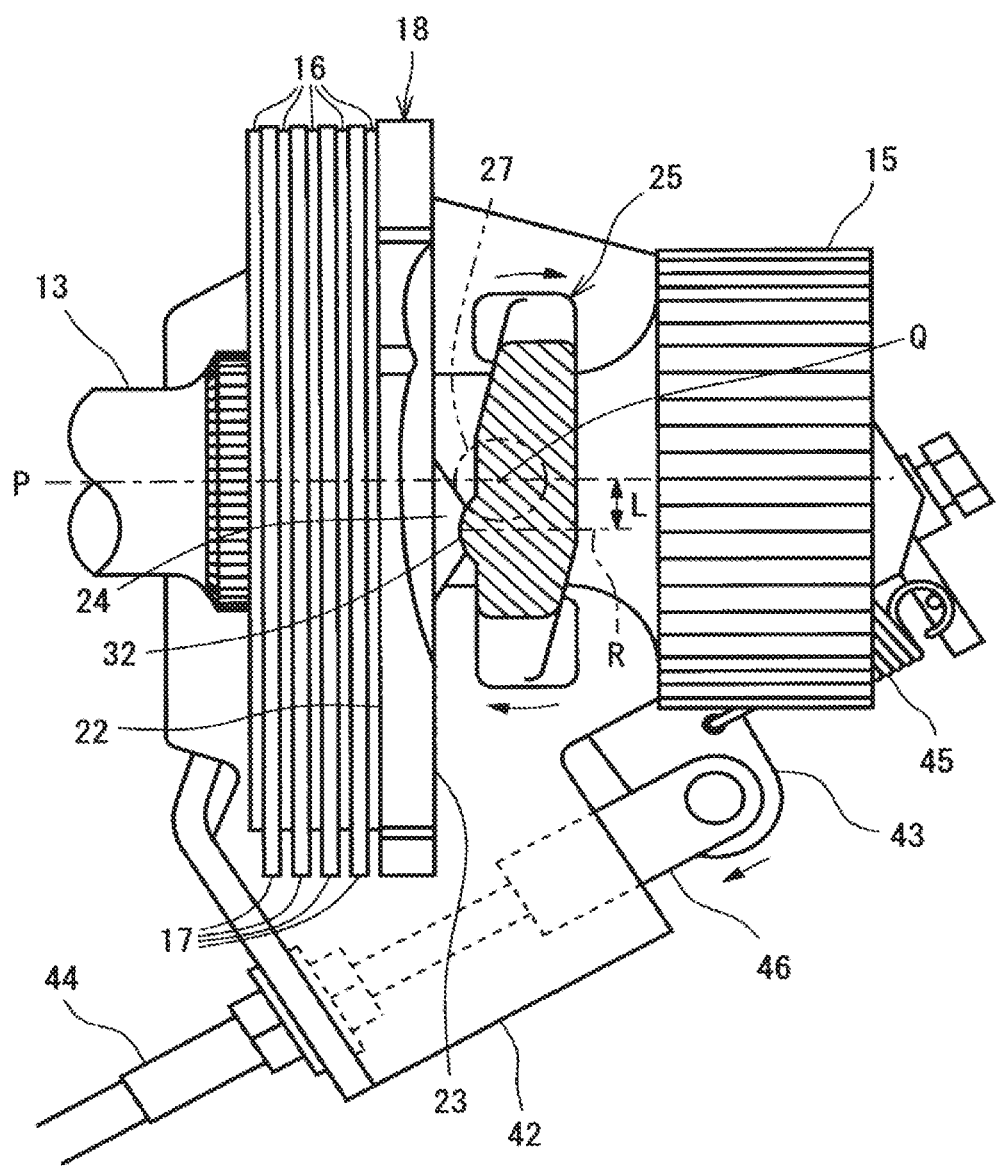
FIG. 5 is a plan view showing a main part of the wet parking brake device during braking operation according to the embodiment of the present disclosure.

Each of the pressing portions 32 according to the present embodiment is formed of a protrusion 32A protruding from the opposite surface 31. Each protrusion 32A has a protruded curve surface 32B having an arched cross section. The upper and lower protruded curve surfaces 32B are coaxial with each other, that is, the centers of the upper and lower protruded curve surfaces 32B in the radial direction coincide with each other. As shown in FIG. 5, an axial straight line R passes through the center of the recessed curve surfaces 24B in the horizontal direction. In a state in which the protruded curve surfaces 32B are in contact with the recessed curve surfaces 24B, the protruded curve surface 32B is offset against the central axis P of the rotary shaft 13 by the distance L between the central axis P and the straight line R.

The upper shaft portion 27 located on the upper part of the rod main body 26 is coaxial with the lower shaft portion 28 located on the lower part of the rod main body 26. The upper shaft hole 35 is formed in the upper part of the shaft case 12 through which the upper shaft portion 27 is inserted. The upper shaft hole 35 is a through hole through which the inner and outer sides of the shaft case 12 are communicated. The upper shaft portion 27 is turnably inserted into the shaft case 12 via a metal bush 36. The upper shaft hole 35 is sealed by a plug 37 from the outside of the shaft case 12.

The shaft case 12 has in the lower part thereof a lower shaft hole 38 that is located to be coaxial with the upper shaft hole 35. The lower shaft hole 38 is a through hole through which the inner and outer sides of the shaft case 12 are communicated. The lower shaft portion 28, which has spline teeth 29, has been inserted into the lower shaft hole 38, and then is fitted to a connecting shaft 39 by spline joint. Therefore, the diameter of the lower shaft hole 38 is determined in accordance with the outer diameter of the connecting shaft 39. The lower shaft hole 38 includes a needle bearing 40 and a seal member 41. The connecting shaft 39 is turnably inserted in the shaft case 12 via the needle bearing 40. The seal member 41 prevents leakage of the lubrication oil from the connecting shaft 39 and mixing of foreign matter into the lubrication oil. The parking rod 25 is turnable relative to the shaft case 12 around the central axis Q of the upper shaft portion 27 and the lower shaft portion 28. This means the central axis Q corresponds to the turning axis of the parking rod 25.

Figure 6:
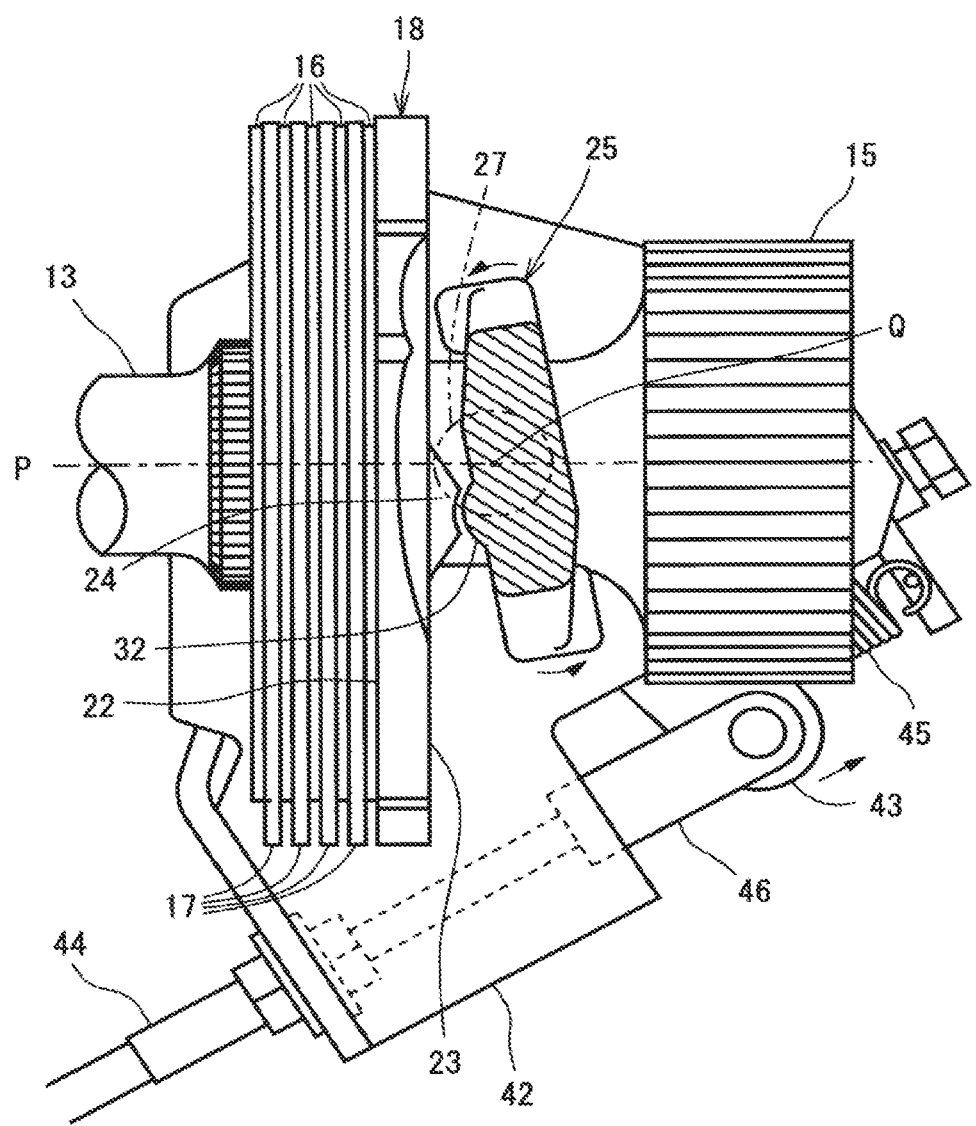
FIG. 6 is a plan view showing the main part of the wet parking brake device during braking releasing operation according to the embodiment of the present disclosure.

As shown in FIG. 1, a supporting plate 42 is attached on the lower part of the shaft case 12. The supporting plate 42, which projects out from the shaft case 12, has a horizontal surface. The connecting shaft 39 connected to the parking rod 25 penetrates through the supporting plate 42 downwardly. On the lower end of the connecting shaft 39, an arm member 43 extended in the radial direction of the connecting shaft 39 is fixed. As shown in FIGS. 5 and 6, a tip portion of the arm member 43 is connected to one end of the wire 44 via a clevis 46. The other end of the wire 44 is connected to a parking lever or a parking pedal which is mounted to the driver's seat. Thus, the arm member 43 turns around the central axis Q of the upper shaft portion 27 and the lower shaft portion 28 of the parking rod 25 by operation of the parking lever. In the present embodiment, the turning angle of the arm member 43 is about 10 degrees. The supporting plate 42 and the arm member 43 are connected by a coil spring 45, which works as an urging member. The coil spring 45 is an extension spring. When the braking state is released, the coil spring 45 urges the arm member 43 in a direction of returning to an original position. For the ease of explanation, the illustration of the shaft case 12 is omitted in FIGS. 5 and 6.

The following will describe the operation of the wet parking brake device 10 according to the present embodiment. When an operator of the forklift operates the parking lever or the parking pedal to set the wet parking brake device 10 in a braking state, the arm member 43 is caused to turn around the central axis Q of the parking rod 25. In FIG. 5, the arm member 43 turns clockwise, so that the parking rod 25 also turns clockwise.

The turning of the parking rod 25 causes the parking rod 25 to press the piston plate 18. The pressing portions 32 of the rod main body 26 press the pressed portions 24 of the piston plate 18. When the parking rod 25 presses the piston plate 18, the piston plate 18 moves in the axial direction of the rotary shaft 13. The pressing from the piston plate 18 decreases the respective spaces between the stators 17 and the brake discs 16, and then the stators 17 and the brake discs 16 are in pressure contact with each other. These contacts generate the braking force against the rotary shaft 13, and thus, the wet parking brake device 10 is set in the braking state. In the braking state, the central axis of the insertion hole 30 of the parking rod 25 coincides with the central axis P of the rotary shaft 13.

When the parking rod 25 presses the piston plate 18, the protruded curve surfaces 32B of the pressing portions 32 press the recessed curve surfaces 24B of the pressed portions 24 in the axial direction of the rotary shaft 13 with the protruded curve surfaces 32B sliding, so that the contact positions are not shifted. Even if the piston plate 18 is slightly shifted in the radial direction of the rotary shaft 13, the protruded curve surfaces 32B of the pressing portions 32 slide into the recessed curve surfaces 24B of the pressed portions 24 and fit thereto, so that the piston plate 18 may be pressed at the correct position. Therefore, the automatic alignment of the piston plate 18 can be achieved by the configuration in which the protruded curve surfaces 32B of the pressing portions 32 slide into the recessed curve surfaces 24B of the pressed portions 24 and fit thereto.

When an operator of the forklift operates the parking lever or the parking pedal to release the braking state of the wet parking brake device 10, the arm member 43 is caused to turn around the central axis Q of the parking rod 25. In FIG. 6, the arm member 43 turns counter-clockwise, so that the parking rod 25 also turns counter-clockwise. The parking rod 25 is detached from the piston plate 18, and then the piston plate 18 returns to an original position by receiving the urging force of the urging member. Returning the piston plate 18 to the original position increases the respective spaces between the stators 17 and the brake discs 16 so as to release the braking state of the wet parking brake device 10. In a released state in which the braking force is released, the central axis of the insertion hole 30 of the parking rod 25 is inclined relative to the central axis P of the rotary shaft 13.

The wet parking brake device 10 of the present embodiment has the following advantageous effects.

(1) The rotary shaft 13 is inserted into the insertion hole 30 of the parking rod 25, and the rod main body 26 of the parking rod 25 has the shape which does not protrude from the area enclosed by the outer peripheral edge of the piston plate 18 in the radial direction of the rotary shaft 13. This configuration decreases a part of the pressing mechanism 20, which protrudes from the area enclosed by the outer peripheral edge of the piston plate 18, so that the required space for the pressing mechanism 20 is reduced. Therefore, the wet parking brake device 10 may achieve further downsizing.

(2) In the braking state, the protruded curve surfaces 32B of the pressing portions 32 are in surface contact with the recessed curve surfaces 24B of the pressed portions 24. This configuration prevents the piston plate 18 from shifting in the radial direction of the rotary shaft 13, so that the positions of the pressed portions 24 pressed by the pressing portions 32 are not changed. Therefore, the transmission efficiency of the load, which is transmitted through the pressing portions 32 and the pressed portions 24 to the piston plate 18, does not vary, so that the transmission efficiency of this load can be constant.

(3) As long as the central axis Q of the parking rod 25 is perpendicular to the central axis P of the rotary shaft 13 and the rod main body 26 has the shape which does not protrude from the area enclosed by the outer peripheral edge of the piston plate 18 in the radial direction of the rotary shaft 13, the rod main body 26 may be as large as possible. The larger the rod main body 26 becomes, the easier it is to secure the strength of the parking rod 25 against the load applied by the pressing of the piston plate 18.

(4) Compared to a conventional parking brake device, the pressing portions 32 and the pressed portions 24 are located at enough adjacent position from the central axis Q of the parking rod 25. This configuration generates a sufficiently large pressing force against the piston plate 18 in the axial direction of the rotary shaft 13 from torque which is applied through the arm member 43 into the parking rod 25, and thus, the required braking force is secured.

Although the present disclosure is not limited to the specific embodiments described above, and may appropriately be modified within the gist of the present disclosure. For example, the following modifications may be allowed.

The embodiment described above, in which the pressed portions of the piston plate includes the recessed curve surfaces and the pressing portions of the parking rod includes the protruded curve surfaces, is not limited to this configuration. This means that each of the pressing portions includes a surface which has a shape of one of a protruded curve and a recessed curve, and each of the pressed portions includes a surface which has a shape of the other of the protruded curve and the recessed curve and is configured to be in surface contact with the surface which has the shape of the one of the protruded curve and the recessed curve included in the corresponding pressing portion. For example, as shown in FIG. 7A, the pressed portions 24 of the piston plate 18 may include the protrusions 24C, which have the protruded curve surfaces 24D. As shown in FIG. 7B, the pressing portions 32 of the parking rod 25 may include the projections 32C, which have the recessed curve surfaces 32D configured to be in contact with the protruded curve surfaces 24D. This configuration has an effect equivalent to the configuration in which the pressed portions 24 of the piston plate 18 include the recessed curve surfaces 24B and the pressing portions 32 of the parking rod 25 include the protruded curve surfaces 32B. The following configuration is also allowed. The pressed portions of the piston plate 18 may be replaced with flat plate surfaces 22 and the pressing portions 32 of the parking rod 25 may not include the protruded curve surfaces or the recessed curve surfaces.

The embodiment described above, in which the turning axis of the parking rod is perpendicular to the central axis of the rotary shaft, is not limited to this configuration. The turning axis of the parking rod may not be perpendicular to the central axis of the rotary shaft as long as the rod main body does not protrude from the area enclosed by the outer peripheral edge of the piston plate in the radial direction of the rotary shaft.

The embodiment described above, in which the present disclosure is applied to a forklift as the industrial vehicles, is not limited to an application to a forklift. The present disclosure may be applied to cargo vehicles and or construction vehicles other than a forklift.

What is claimed is:
1. A wet parking brake device comprising:
a shaft case;
a rotary shaft accommodated in the shaft case;
a plurality of stators held on the shaft case and arranged side by side movably in an axial direction of the rotary shaft;
a plurality of brake discs held on the rotary shaft and each of which is interposed between any two adjacent stators of the plurality of stators;
a piston plate held on the shaft case and movable toward the brake discs in the axial direction of the rotary shaft; and
a pressing mechanism configured to press the piston plate toward the brake discs,
the wet parking brake device being configured such that the brake discs and the stators come in contact with each other by a pressing from the piston plate pressed by the pressing mechanism to thereby generate a braking force against the rotary shaft, wherein
the pressing mechanism includes:
a parking rod that is turnably supported in the shaft case and has a turning axis in a vertical direction; and
an arm member that is connected to the parking rod and turns around the turning axis,
the parking rod includes:
a rod main body which has an insertion hole through which the rotary shaft is inserted and a pressing portion that presses the piston plate;
an upper shaft portion that is located on an upper part of the rod main body; and
a lower shaft portion that is located on a lower part of the rod main body and is coaxial with the upper shaft portion, and
the rod main body has a shape which does not protrude from an area enclosed by an outer peripheral edge of the piston plate in a radial direction of the rotary shaft.

2. The wet parking brake device according to claim 1, wherein
a pair of the pressing portions is provided in upper and lower sides of the rod main body,
the piston plate includes a pair of pressed portions in the upper and lower sides thereof, each of the pressed portion being configured to be pressed by the corresponding pressing portion,
each of the pressing portions includes a surface which has a shape of one of a protruded curve and a recessed curve, and
each of the pressed portions includes a surface which has a shape of the other of the protruded curve and the recessed curve and is configured to be in surface contact with the surface which has the shape of the one of the protruded curve and the recessed curve included in the corresponding pressing portion.

3. The wet parking brake device according to claim 1, wherein the turning axis is perpendicular to a central axis of the rotary shaft.

* * * * *